(12) United States Patent
Martin et al.

(10) Patent No.: US 10,776,656 B2
(45) Date of Patent: Sep. 15, 2020

(54) METHODS AND SYSTEMS FOR APPLYING CONTENT AWARE STICKERS ONTO A LAYOUT

(71) Applicants: Laurent Francois Martin, Carlsbad, CA (US); Narendra Dubey, San Francisco, CA (US)

(72) Inventors: Laurent Francois Martin, Carlsbad, CA (US); Narendra Dubey, San Francisco, CA (US)

( * ) Notice: Subject to any disclaimer, the term of this patent is extended or adjusted under 35 U.S.C. 154(b) by 131 days.

(21) Appl. No.: 16/230,332

(22) Filed: Dec. 21, 2018

(65) Prior Publication Data

US 2019/0197346 A1    Jun. 27, 2019

Related U.S. Application Data

(60) Provisional application No. 62/609,966, filed on Dec. 22, 2017.

(51) Int. Cl.
*G06K 9/00* (2006.01)
*G06K 9/62* (2006.01)
*G06K 9/46* (2006.01)

(52) U.S. Cl.
CPC ....... *G06K 9/6201* (2013.01); *G06K 9/00664* (2013.01); *G06K 9/6215* (2013.01); *G06K 9/6267* (2013.01); *G06K 9/46* (2013.01); *G06K 2209/01* (2013.01)

(58) Field of Classification Search
CPC ................. G06K 2209/01; G06K 9/00–82
See application file for complete search history.

(56) References Cited

U.S. PATENT DOCUMENTS

| | | | |
|---|---|---|---|
| 2011/0320454 A1* | 12/2011 | Hill | G06N 20/00 707/739 |
| 2012/0054177 A1* | 3/2012 | Wang | G06F 16/5854 707/723 |
| 2014/0172884 A1* | 6/2014 | Wang | G06F 16/24578 707/749 |
| 2015/0081703 A1* | 3/2015 | Murphy-Chutorian | G06F 16/5866 707/736 |
| 2016/0294894 A1* | 10/2016 | Miller | H04L 63/102 |
| 2017/0300495 A1* | 10/2017 | Sharifi | G06F 16/90335 |
| 2017/0351417 A1* | 12/2017 | Manico | G06F 16/50 |
| 2019/0019052 A1* | 1/2019 | Pao | G06K 9/3258 |
| 2019/0197133 A1* | 6/2019 | Biswas | G06F 16/583 |
| 2019/0197346 A1* | 6/2019 | Martin | G06K 9/00664 |
| 2019/0204155 A1* | 7/2019 | Martin | G01J 3/462 |
| 2019/0206105 A1* | 7/2019 | Martin | G06F 8/38 |
| 2019/0206106 A1* | 7/2019 | Martin | G06T 11/60 |
| 2019/0286648 A1* | 9/2019 | Wan | G06F 16/583 |
| 2019/0294259 A1* | 9/2019 | Liu | G06N 3/0454 |

* cited by examiner

*Primary Examiner* — Sean T Motsinger
(74) *Attorney, Agent, or Firm* — Mannava & Kang, P.C.; Vinay Malik

(57) ABSTRACT

Embodiments herein disclose methods and systems for applying content aware stickers onto a layout (wherein the layout can be a digital layout or a physical layout) and the stickers can add a decorative or narrative element about the images and/or the layout.

20 Claims, 12 Drawing Sheets

METHODS AND SYSTEMS FOR APPLYING CONTENT AWARE STICKERS ONTO A LAYOUT

CROSS REFERENCE TO RELATED APPLICATION

This application is based on and derives the benefit of U.S. Provisional Application 62/609,966, the contents of which are incorporated herein by reference.

TECHNICAL FIELD

The embodiments herein relate to visual graphic design and layouts and, more particularly, to applying content aware stickers onto a layout.

BACKGROUND

Given a visual layout of 1 to n objects on a surface area, there is a design challenge in filling the rest of the space which is typically left unoccupied (hereinafter referred to as interstitial space or whitespace or white space). The whitespace can detract from the look of the surface area.

In an example (as depicted in FIG. 1), consider that a plurality of images is being placed in a page of a photo album. On placing all the images in the page, there may be unoccupied space present between the images. While one or more colors may be present in the background of the images on the page, the white space may detract from the overall look of the page.

BRIEF DESCRIPTION OF THE FIGURES

The embodiments disclosed herein will be better understood from the following detailed description with reference to the drawings, in which.

DETAILED DESCRIPTION OF EMBODIMENTS

Figure 1:
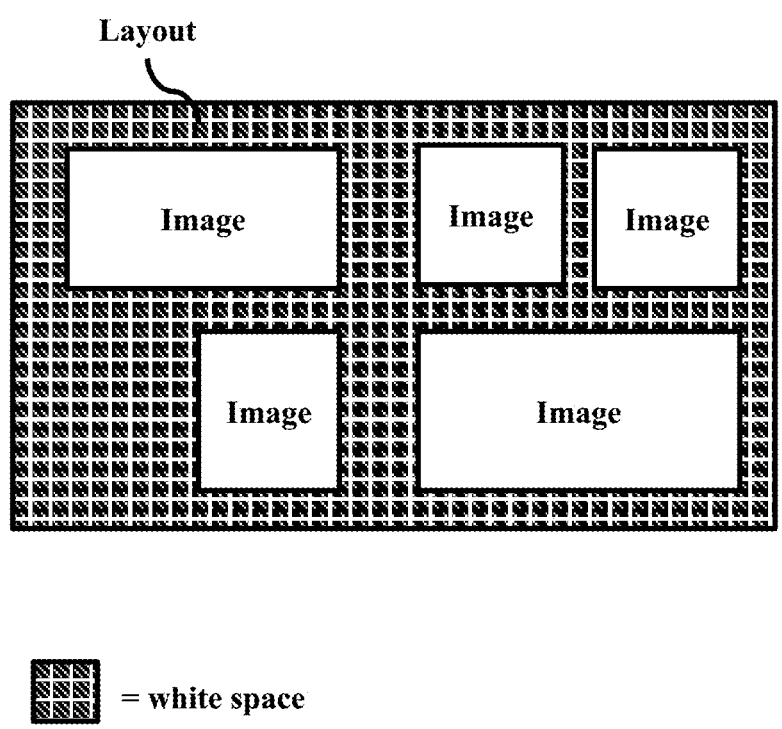
FIG. 1 depicts an example of whitespace in a page where one or more images have been placed.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for determining at least one content aware sticker that can be applied onto a layout (wherein the layout can be a digital layout or a physical layout) and the stickers can add a decorative or narrative element about at least one object/image present in the layout and/or the layout. Referring now to the drawings, and more particularly to FIGS. 2A through 6C, where similar reference characters denote corresponding features consistently throughout the figures, there are shown embodiments.

'Layout' as referred to herein can be a 'base' or 'background' 2-D geometric surface of any suitable shape, wherein one or more geometric objects are overlaid on the layout. Layouts can be a combination of at least one of statically pre-determined layouts and dynamically generated layouts (wherein the dynamically generated layout can be dynamically generated at runtime). Layouts can comprise of different categories (also referred to herein as spread), such as front cover, back cover, first inside page, last inside page, one-page left, one-page right, two-page layout, 2-page layout crease compatible, and so on. Each layout can comprise of a configurable number of wells, wherein objects can be placed into the wells present in the layout. The layout can be of a pre-defined aspect ratio (H×W). The aesthetic characteristic of a layout can be described using a multi-dimensional vector, hereinafter referred to as an aesthetic vector. Examples of the geometric objects can be, but not limited to, rectangles, squares, circles, diamonds, and so on. Embodiments herein have used the terms 'layout', 'canvas' to indicate the layout interchangeably.

'Object' as referred to herein can refer to a 2-dimensional geometric object, which can be placed on a layout. In an embodiment herein, the user can provide the objects in real-time. In an embodiment herein, the objects can be fetched from a pre-defined location such as a local or remote database, a local file system, a remote file server, a data server, cloud storage, and so on. In an embodiment herein, a user can place one or more objects on the layout. In an embodiment herein, one or more objects can be placed automatically on the layout. Examples of the object can be, but not limited to, photos/images, paintings, sketches, drawings, graphic art, clip art, stickers, text, decorative text, and so on. Embodiments herein use an image as an example of an object for ease of explanation, however, it may be obvious to a person of ordinary skill in the art that embodiments as disclosed herein can be extended to any other type of object.

'Sticker' as referred to herein can refer to an object, which can be placed on a layout, wherein the sticker can be used for embellishing the layout. In an embodiment herein, the user can provide at least one sticker. In an embodiment herein, at least one sticker can be fetched from a pre-defined location such as a local or remote database, a local file system, a remote file server, a data server, cloud storage, and so on. In an embodiment herein, one or more stickers can be placed automatically on the layout. Examples of the sticker can be, but not limited to, paintings, sketches, drawings, graphic art, clip art, stickers, text, decorative text, decorative elements, frames, and so on.

Figure 2A:
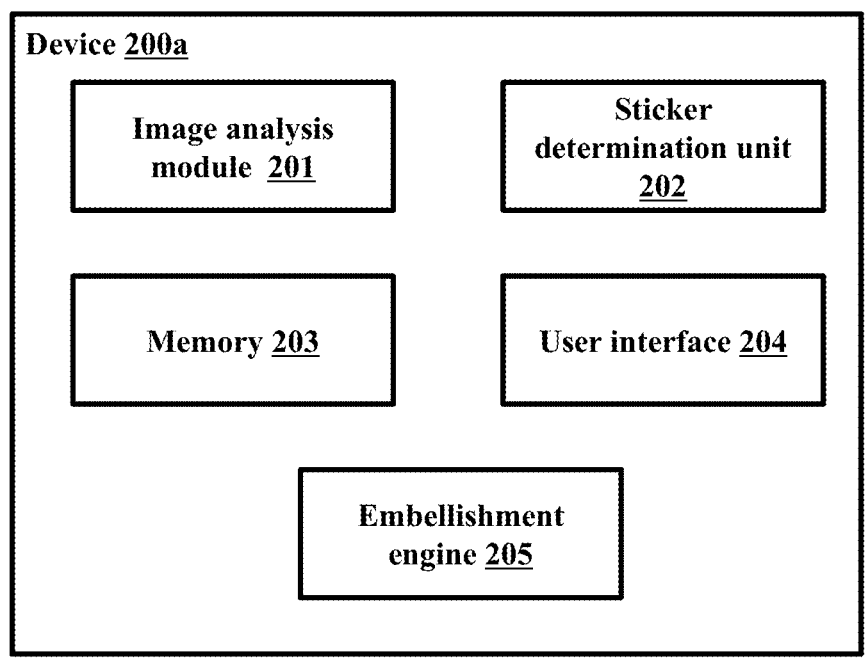
FIGS. 2A, 2B and 2C depict a system for determining at least one content aware sticker that can be applied onto a layout, according to embodiments as disclosed herein.
Figure 2B:
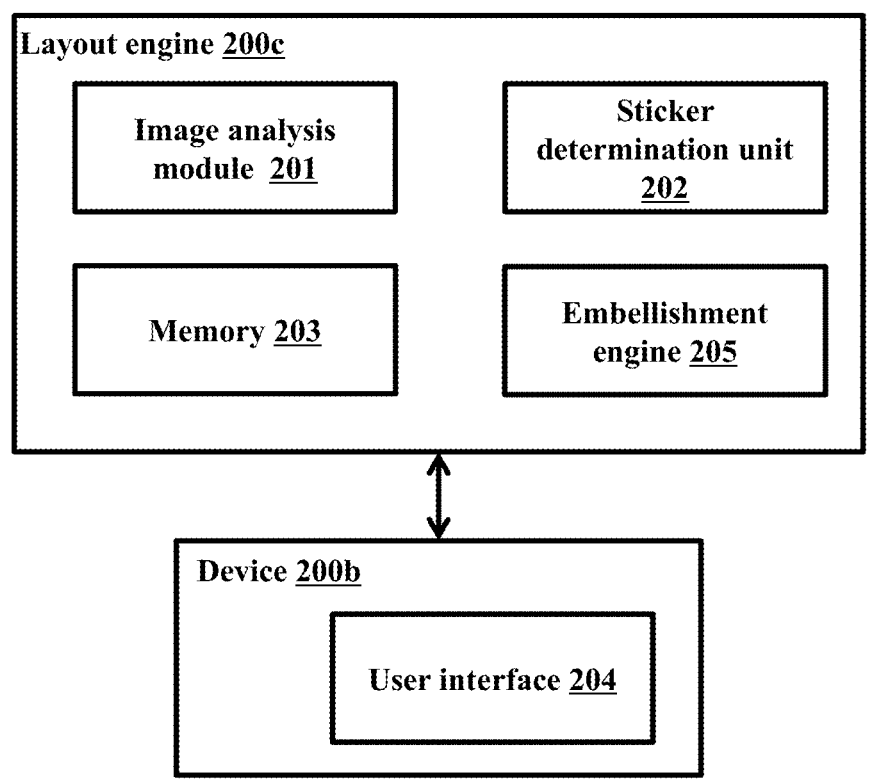
Figure 2C:
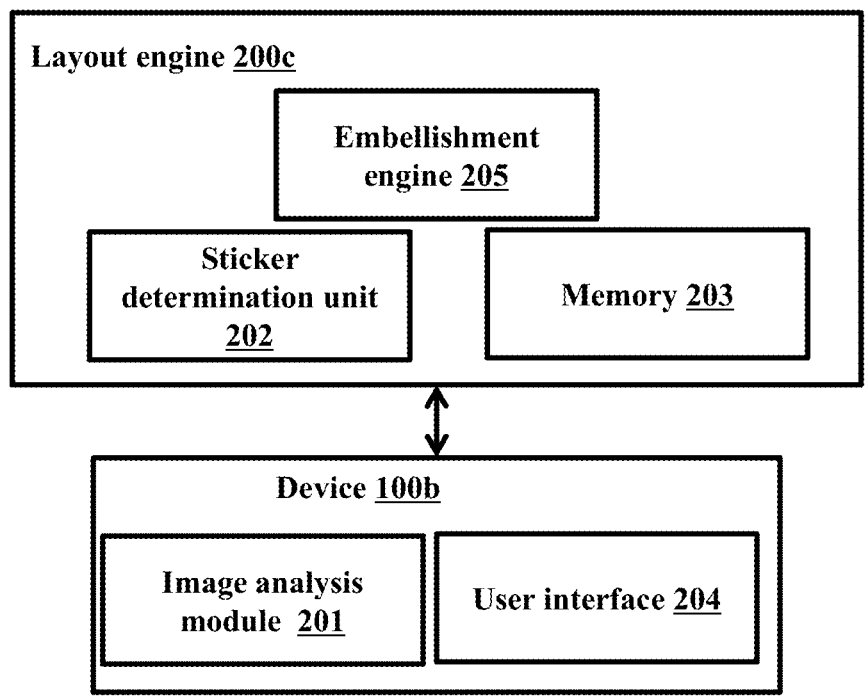

FIGS. 2A, 2B and 2C depict a system for determining at least one content aware sticker that can be applied onto a layout. The system 200, as depicted in FIG. 2A, can comprise a device 200a, which can further comprise an image analysis module 201, a sticker determination unit 202, a memory 203, at least one user interface 204, and an embellishment engine 205. Examples of the device 200a can be, but not limited to, a laptop, a computer, a mobile phone, a tablet, a smart phone, an Internet of Things (IoT) device, a wearable computing device, a server, and so on.

The system 200, as depicted in FIG. 2B, can comprise a device 201b comprising at least one user interface 204. The device 200b can be connected to a layout management engine 200c using at least one of a wired means and/or a wireless means. Examples of the layout management engine 200c can be, but not limited to, a database, a file system, a server, a file server, a data server, the Cloud, and so on. The layout engine 200c can further comprise an image analysis module 201, a sticker determination unit 202, a memory 203, and an embellishment engine 205.

The system 200, as depicted in FIG. 2C, can comprise a device 201b comprising at least one user interface 204 and the image analysis module 201. The device 200b can be connected to a layout management engine 200c using at least one of a wired means and/or a wireless means. Examples of the layout management engine 200c can be, but not limited to, a database, a file system, a server, a file server, a data server, the Cloud, and so on. The layout engine 200c can further comprise a sticker determination unit 202, a memory 203, and an embellishment engine 205.

The user interface 204 can enable the user and/or an authorized user (such as an administrator) to provide at least one input to the image analysis module 201. Considering an example of a user, the user may provide at least one image, at least one label that can be used to describe the image, using the user interface 204. Examples of the user interface 204 can be, but not limited to, a display, a touchscreen, a keyboard, a mouse, and so on. The label can be at least one of a word, a phrase, a sentence, a paragraph, and so on.

The memory 203 can comprise a plurality of stickers, wherein each sticker can comprise one or more keywords associated with it. The keyword can be at least one of a word, a phrase, a sentence, a paragraph, and so on. In an embodiment herein, the keyword can be provided manually. In an embodiment herein, the keyword can be provided using an automated process, such as, but not limited to, computer vision techniques, Optical Character Recognition (OCR), image/schematic analysis, and so on.

On fetching a layout and the images present in the layout (from the user interface 204 and/or the memory 203), the image analysis module 201 can use computer vision to detect at least one attribute related to an image present in the layout. Examples of the attribute can be, but not limited to, at least one item present in the image, a feeling/emotion displayed by one or more subjects present in the image, an activity being performed by one or more subjects present in the image, the location where the image was captured, and so on. On detecting the attributes in the images present in the layout, the image analysis module 201 can assign at least one label to each image. Examples of the label can be people, faces, joy, food, wine, celebration, dinner, monument, restaurant, couple eating in a restaurant, and so on. The image analysis module 201 can determine a presence probability for each of the labels, which represents the likelihood of the accuracy of the label prediction. In an example herein (consider the image depicted in FIG. 6A), the image analysis module 201 can determine how certain it is that a collection of pixels actually represents a bike or a glass of champagne.

In an embodiment herein, the ontology used in the labels and in the keywords can be the same to ensure an overlap, i.e., the words used as labels and the words used as keywords are part of the same lexicon.

Figure 6A:
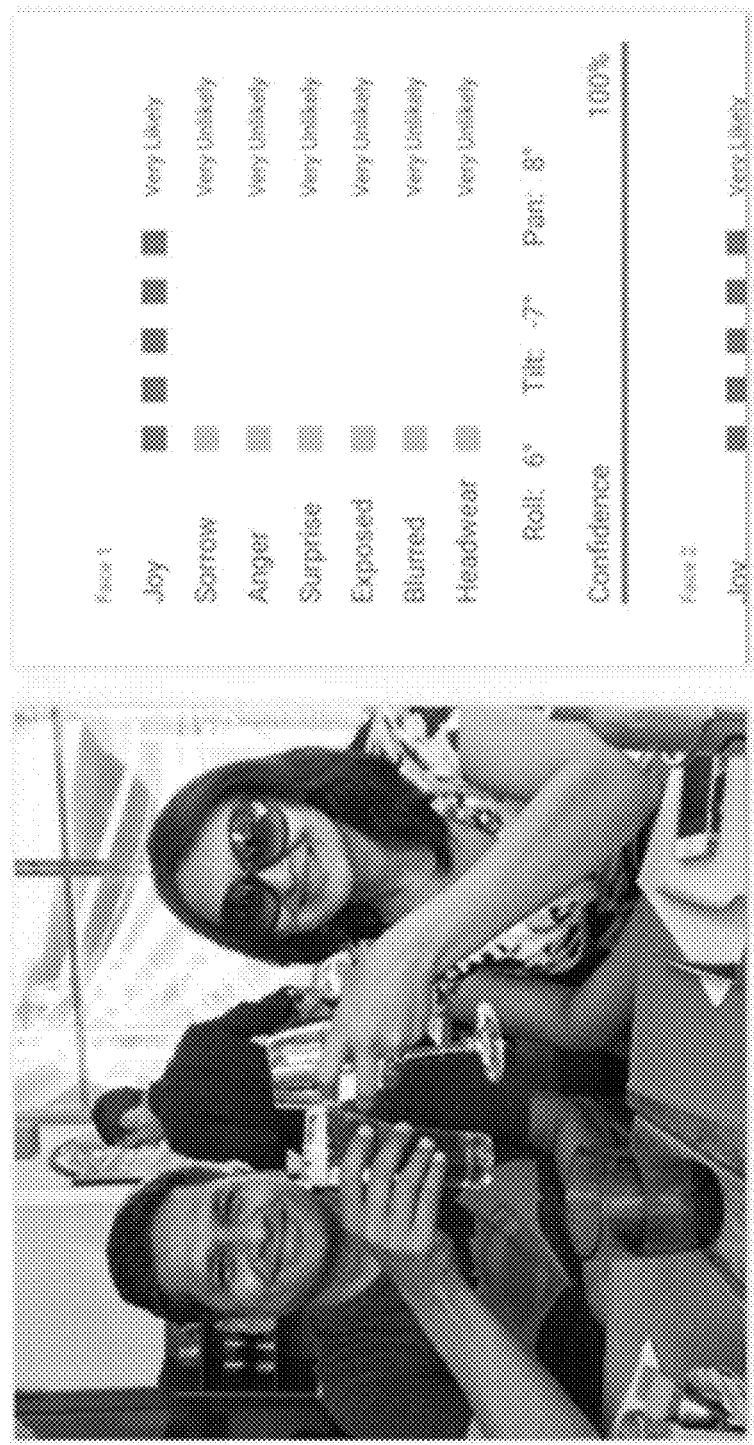
FIGS. 6A, 6B and 6C depict an example photo and at least one sticker being placed in the corresponding layout, according to embodiments as disclosed herein.

Consider an example (as depicted in FIG. 6A), wherein there is an image of a smiling couple having dinner at a restaurant with a bottle of wine on the table. The image analysis module 201 can determine that it is very likely that 'joy' is the main attribute associated with the image. The image analysis module 201 can further assign one or more labels to the image, such as 'glasses', 'drink, 'alcoholic beverage', 'eyewear', 'vision care', 'product', 'fun', 'sunglasses', 'food' and so on. The image analysis module 201 furthers determine a probability score for each one of the labels associated with the image, such as 'glasses—89%', 'drink—89%, 'alcoholic beverage—78%', 'eyewear—74%', 'vision care—74%', 'product—69%', 'fun—68%', 'sunglasses—63%', 'food—56%' and so on (as depicted in the example in FIG. 6B).

The image analysis module 201 can determine a relevance score for each label, wherein the relevance score can depend on the prominence of the attribute associated with that label in that image. The relevance score can be a ratio/percentage that determines the importance of the label to the overall image. In an example herein, the label referencing an attribute placed in the center of the image can be considered to have a higher relative importance as compared to the other labels referencing attributes present in the peripheral regions of the image. For instance, in an image of kids playing on a playground, the relevance of the label 'playground', would be much higher than the relevance of the label 'tree' which would refer to an object present in the background behind the playground.

Consider an example (as depicted in FIG. 6A), the image analysis module 201 furthers determine the relevance score of each one of those labels based on their importance in the image. For instance, the label 'eyewear' will have much smaller relevance (10%) than the label 'fun' because only a small portion of the image is relevant to the 'eyewear' label while, fun would be given a relevance score of (95%) because most of the image is about a fun activity.

The image analysis module 201 can compute an Image Set Relevancy Score (ISRS) for all the labels in an image set. In an embodiment herein, the image analysis module 201 can compute the ISRS for each label by multiplying the probability score, and the relevance score of each label. Consider an example, where for an image present in the layout, a first label has a presence probability of X % and a relevance score of Y %. The image analysis module 201 can compute the ISRS of each label as sum of (X*Y) for all images present in the layout, where X can be zero if the corresponding label is not associated to an image.

In an embodiment herein, the image analysis module 201 can include the importance of the image to the overall layout, while determining the ISRS, wherein the image analysis module 201 can compute the ISRS for each label by multiplying the probability score, the relevance score of each label, and the importance of the image to the overall layout. The importance of the image to the overall layout can be based on factors such as, but not limited to, surface area covered by the image (relative to other images and the overall layout), the positioning of the images (images present in the corner portions of the layout may have less importance, whereas images present to the center portions of the layout may have a higher importance), and so on. and the importance of the image with respect to the overall layout. Consider an example, where for an image present in the layout, a first label has a presence probability of X %, a relevance score of Y % and the importance of the image to the overall layout is Z %. The image analysis module 201 can compute the ISRS as of the first label as the sum of (X*Y*Z) for all images present in the layout, where X can be zero if the corresponding label is not associated with an image.

The image analysis module 201 can retain the labels which have a ISRS greater than a pre-defined threshold. The image analysis module 201 can provide the label(s) and their corresponding ISRS to the sticker determination unit 202.

The sticker determination unit 202 can receive the assigned label(s) and the corresponding ISRS. The sticker determination unit 202 can then search for at least one sticker in the memory 203 that best matches the set of provided label(s). The sticker determination unit 202 can determine if a sticker matches with a label present in the memory 203 using a match with the combined score. The sticker determination unit 202 can check if at least one assigned label matches a keyword, or a portion of a keyword associated with a sticker present in the memory 203. The sticker determination unit 202 can determine a degree of overlap between the labels associated to an image set and the keyword(s) associated to that sticker.

Based on the degree of overlap, the sticker determination unit 202 can extract a set of stickers, which have at least one or more keywords which match with the labels. The number of extracted stickers can be dependent on the number (diversity) of possible matching keywords. The at least one or more matches with the labels may vary as a function of the average number of keywords associated the library of stickers. In an example herein, the sticker determination unit 202 can extract a set of ten keywords, which have two matches with the labels.

The sticker determination unit 202 can compute an Image Set Score (ISS) for each sticker by computing the sum product of the presence probability of each keyword associated with the sticker by the corresponding label ISRS. Consider an example, where a sticker has two keywords with probabilities $A_p$ and $B_p$ respectively and ISRS for the corresponding matching labels are $A_I$ and $B_I$. The ISS for the sticker can be $((A_p*A_I)+(B_p*B_I))$. The sticker determination unit 202 can sort the matching sticker(s) in descending order, based on the ISS. The sticker determination unit 202 can provide the sorted list of matching sticker(s) to the embellishment engine 205 which uses at least one aesthetic criteria in combination with the ISS to determine which sticker should be used. The embellishment engine 205 can place the sticker(s) on the layout in a suitable manner (as depicted in the example in FIG. 6C).

Figure 6B:
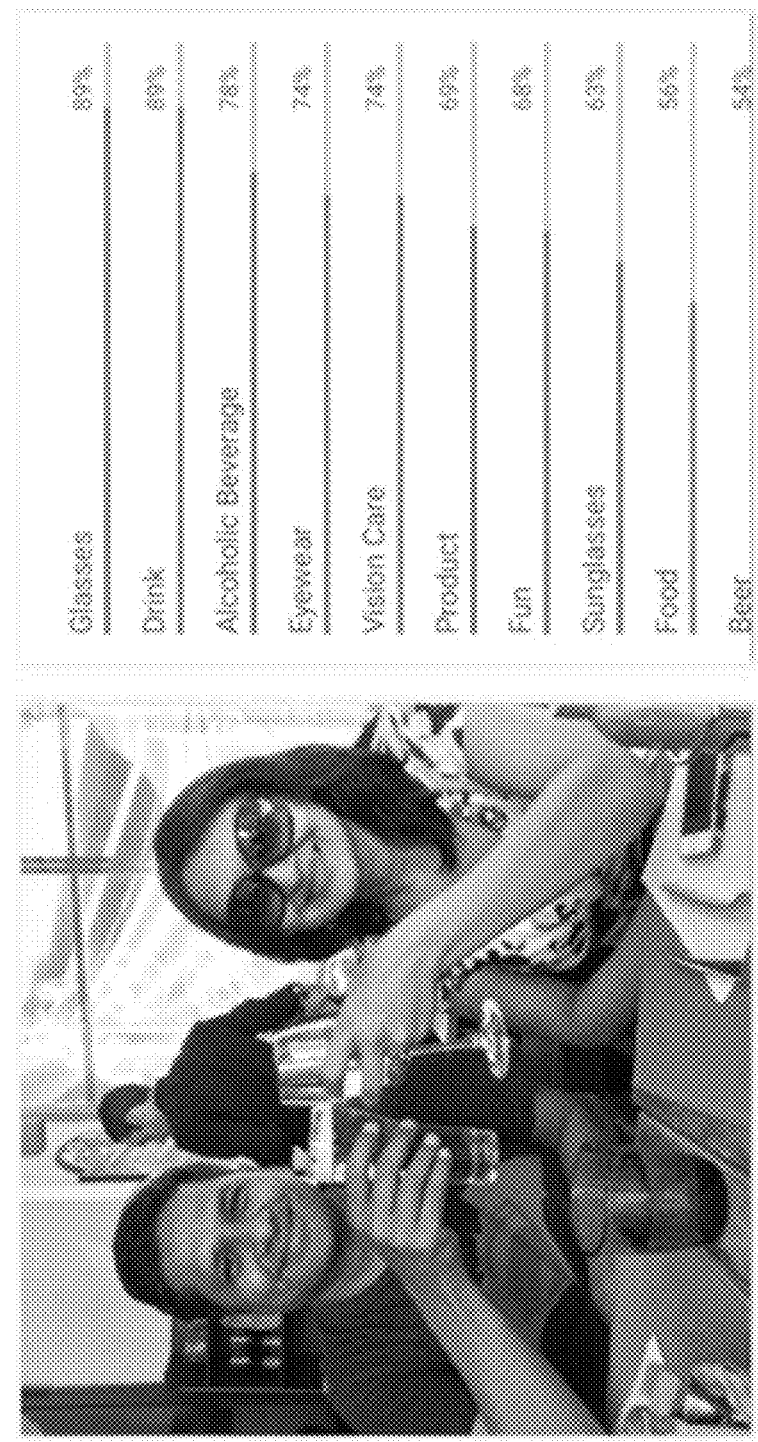
Figure 6C:
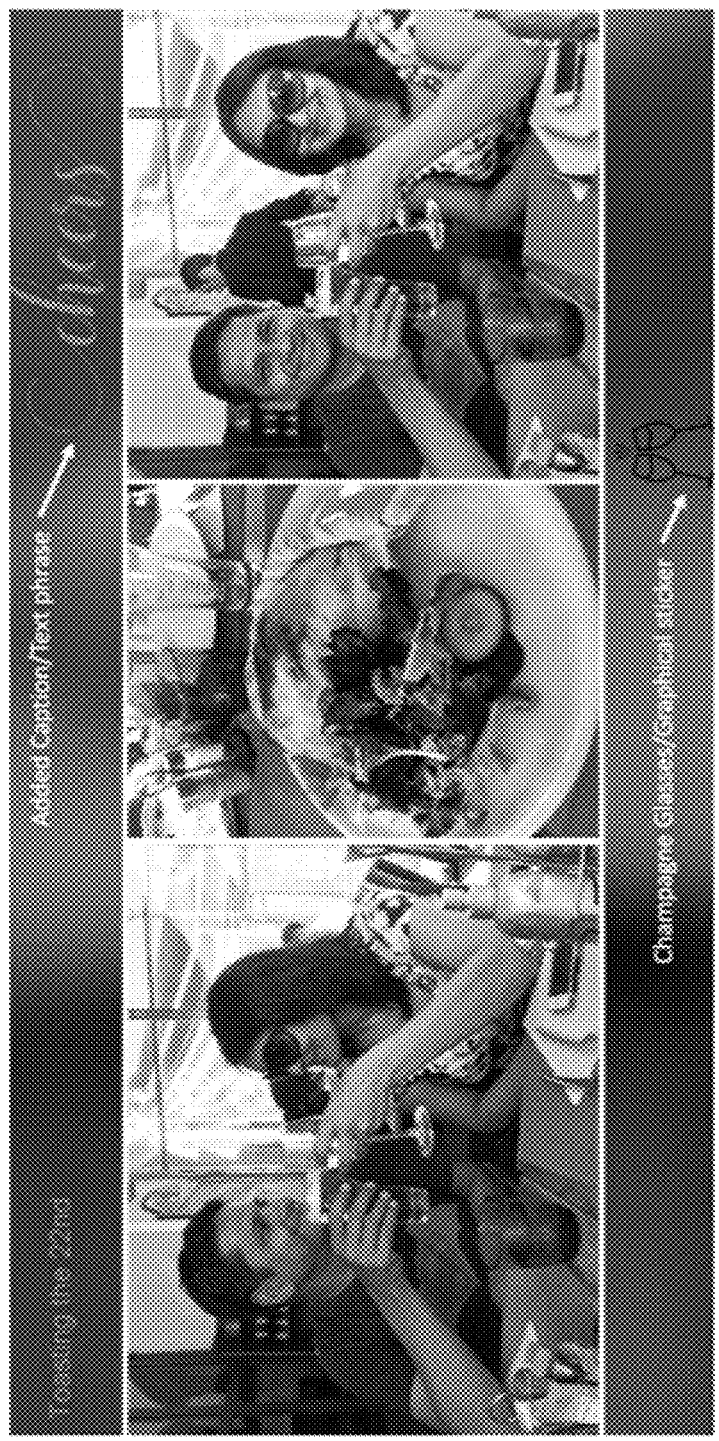

In the example depicted in FIGS. 6A and 6B, since the label 'glasses' has a higher relevance score, the sticker determination unit 202 can choose to apply a sticker associated with 'glasses' such us 'Cheers!' on to the layout.

In another example (considering the same image depicted in FIG. 6A), consider that the label 'glasses' has a confidence level of 0.7 and 'smiling' has a confidence level of 0.9, the sticker determination unit 202 can choose to apply a sticker associated with 'smiling' such as 'everyday happiness' might be chosen.

In an embodiment herein, the sticker determination unit 202 can sort the stickers based on the available white space in the layout using their ISS. The sticker determination unit 202 can determine this based on factors related to the stickers such as, but not limited to, the aspect ratio of the sticker, the orientation of the sticker (horizontal/vertical), and so on.

Figure 3:
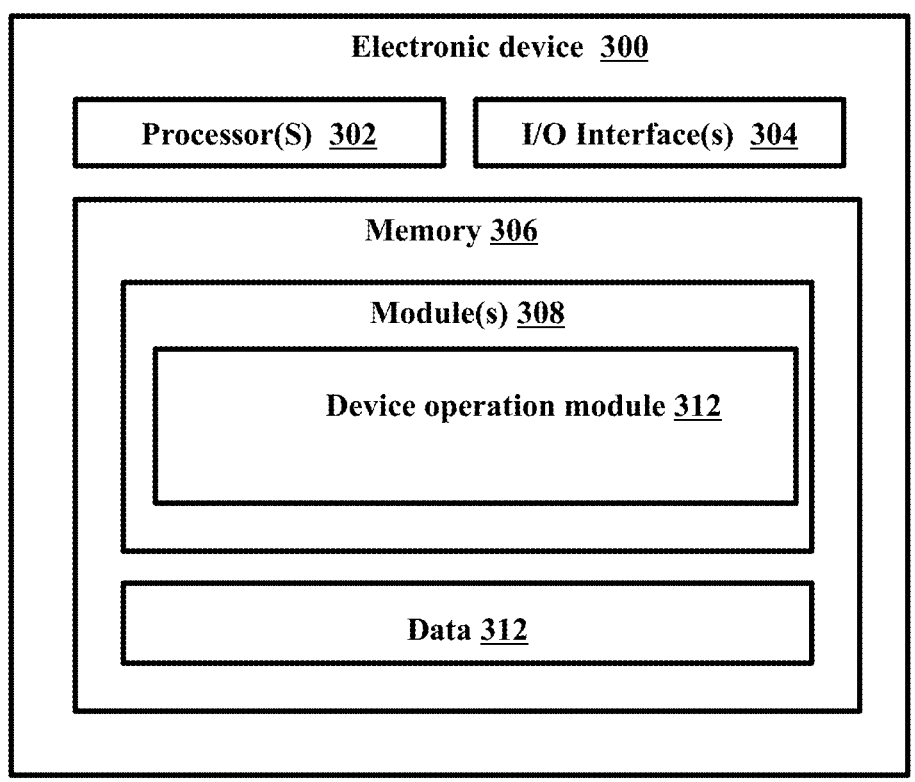
FIG. 3 is a block diagram illustrating a plurality of components of an electronic device 300 for determining at least one content aware sticker that can be applied onto a layout, according to embodiments as disclosed herein.

FIG. 3 is a block diagram illustrating a plurality of components of an electronic device 300 for determining at least one content aware sticker that can be applied onto a layout. The device 300 can be any device that can create and manage a digital image layout. Examples of the device 300 can be, but not limited to, a computer, a laptop, a smart phone, a mobile phone, a tablet, a wearable device, a server, the Cloud, and so on.

Referring to FIG. 3, the electronic device 300 is illustrated in accordance with an embodiment of the present subject matter. In an embodiment, the electronic device 300 may include at least one processor 302, an input/output (I/O) interface 304 (herein a configurable user interface), and a memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 is configured to fetch and execute computer-readable instructions stored in the memory 306.

The I/O interface 304 may include a variety of software and hardware interfaces; for example, a web interface, a graphical user interface such as a display screen, a physical interface, and the like. The I/O interface 304 may allow the electronic device 300 to communicate with other devices. The I/O interface 304 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and so on. The modules 308 include routines, programs, objects, components, data structures, and so on, which perform particular tasks, functions or implement particular abstract data types. In one implementation, the modules 308 may include a device operation module 310. The device operation module 310 can be configured for applying content aware stickers onto a layout. The device operation module 310 can be configured to execute one or more tasks corresponding to the application on the electronic device 300 in accordance with embodiments as disclosed herein.

The device operation module 310 can use computer vision to detect one or more contents in the images present in the layout. Examples of the contents can be, but not limited to, people, expressions of people, actions being performed by the people, images, backgrounds, and so on. The device operation module 310 can then label the detected contents. Examples of the labels can be, but not limited to, people, faces, joy, food, wine, celebration, dinner, monument, restaurant, and so on. Each label can also have a score associated with it, wherein the score can be in terms of percentage and can be based on factors such as how relevant the label is to the image, the importance of the image, the prominence of the image, and so on. Using the label, the device operation module 310 can use the label information to search through a database/memory 306 that contains a library of stickers. The library comprises of stickers that have keywords/keyphrases associated with each of them. These keywords/keyphrases form a semantic language. The device operation module 310 searches for at least one sticker that matches with the labels. The device operation module 310 can compare the keywords/keyphrases with the labels for at least one match. On detecting a match, the device operation module 310 can place the matching sticker in interstitial space in the layout. If there is more than one match, the device operation module 310 can place the one or more matching stickers in the interstitial space. In an embodiment herein, a user can define one or more types of stickers that the user would prefer to be placed in the interstitial space. In an embodiment, the user can modify the stickers, if required, wherein the modifications can be in terms of editing the text, re-sizing, placement, and so on.

The modules 308 may include programs or coded instructions that supplement applications and functions of the electronic device 300. The data 312, amongst other things, serves as a repository for storing data processed, received, and generated by one or more of the modules 308. Further, the names of the other components and modules of the electronic device 300 are illustrative and need not be construed as a limitation.

The memory 306 may include one or more computer-readable storage media. The memory 306 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 306 may, in some examples, be considered a non-transitory storage medium. The term "non-transitory" may indicate that the storage medium is not embodied in a carrier wave or a propagated signal. However, the term "non-transitory" should not be interpreted to mean that the memory 306 is non-movable. In some examples, the memory 306 can be configured to store larger amounts of information than the memory. In certain examples, a non-transitory storage medium may store data that can, over time, change (e.g., in Random Access Memory (RAM) or cache).

FIG. 3 shows exemplary units of the device(s), but it is to be understood that other embodiments are not limited thereon. In other embodiments, the device(s) may include less or more number of units. Further, the labels or names of the units are used only for illustrative purpose and does not limit the scope of the embodiments herein. One or more units can be combined together to perform same or substantially similar function in the device.

Figure 4A:
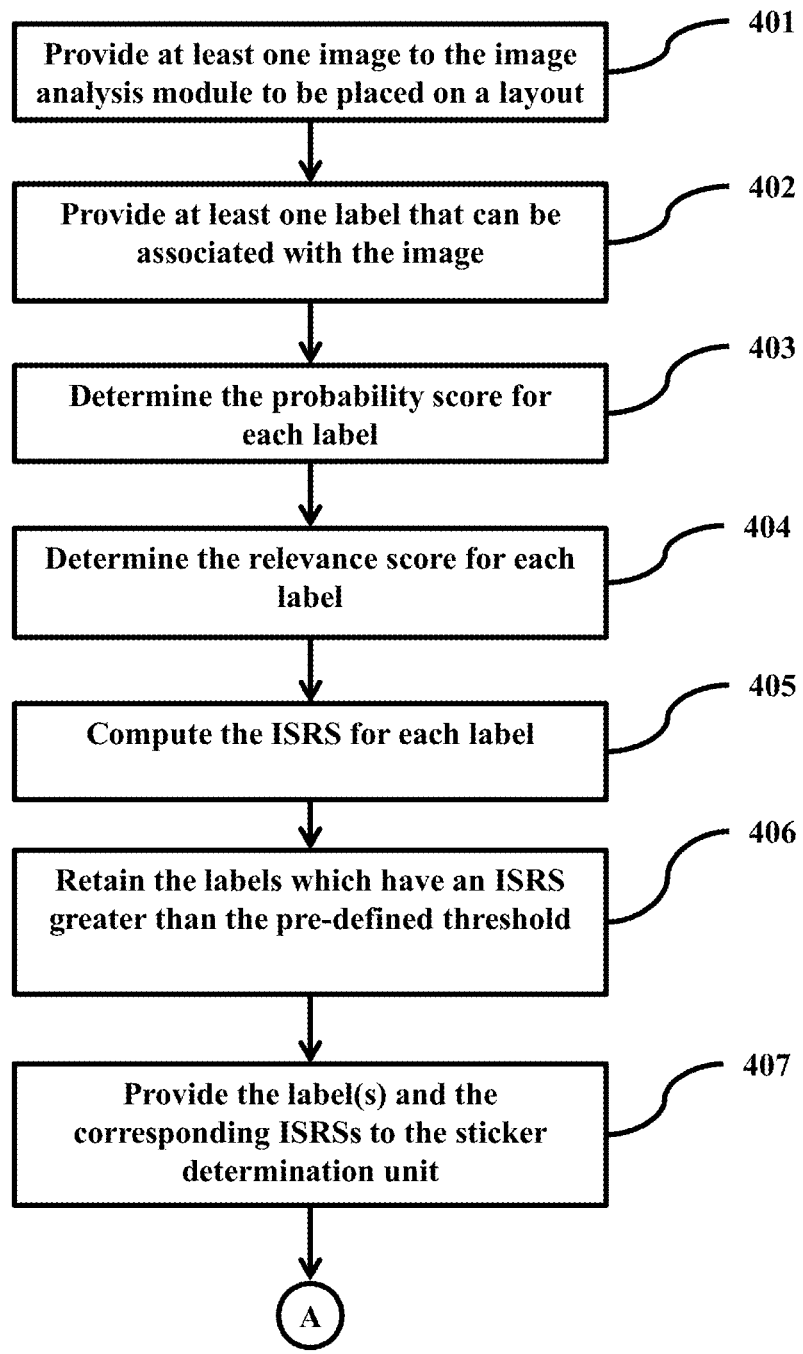
FIGS. 4A and 4B are flowcharts depicting the process of determining content aware stickers that can be applied onto a layout, wherein label(s) for an image present in the layout are provided by a user, according to embodiments as disclosed herein.
Figure 4B:
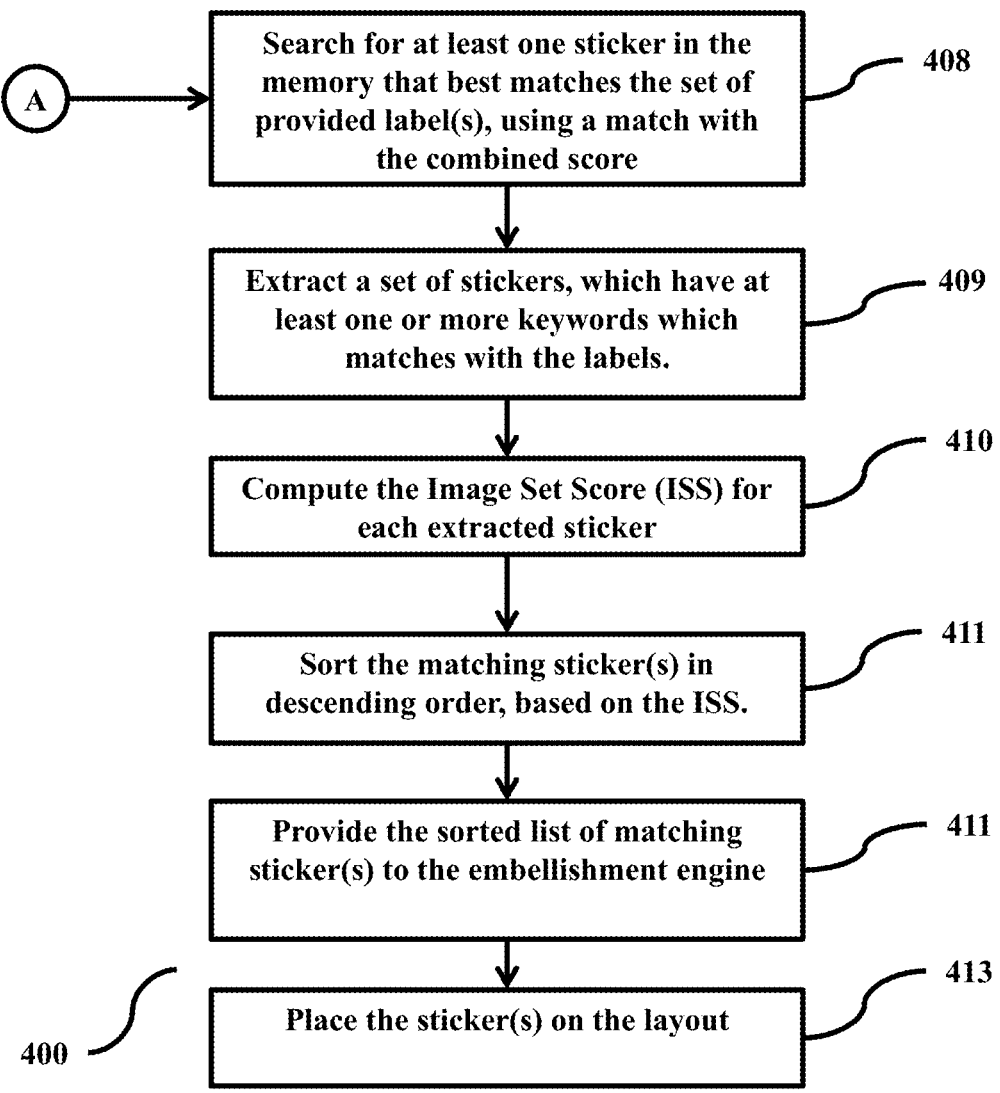

FIG. 4 is a flowchart depicting the process of determining content aware stickers that can be applied onto a layout, wherein label(s) for an image present in the layout are provided by a user. The user and/or an authorized user (such as an administrator) provides (401) at least one image to the image analysis module 201 to be placed on a layout (wherein the image can be placed in the layout (not shown)). The user and/or the authorized user (such as an administrator) provides (402) at least one label that can be associated with the image. The image analysis module 201 determines (403) the presence probability for each of the labels, which represents the likelihood of the accuracy of the label prediction. The image analysis module 201 determines (404) the relevance score for each label, wherein the relevance score can depend on the prominence of the attribute associated with that label in that image. The relevance score can be a ratio/percentage that determines the importance of the label to the overall image. The image analysis module 201 computes (405) the Image Set Relevancy Score (ISRS) for all the labels in an image set. In an embodiment herein, the image analysis module 201 can compute the ISRS for each label by multiplying the probability score, and the relevance score of each label. In an embodiment herein, the image analysis module 201 can include the importance of the image to the overall layout, while determining the ISRS, wherein the image analysis module 201 can compute the ISRS for each label by multiplying the probability score, the relevance score of each label, and the importance of the image to the overall layout. The image analysis module 201 retains (406) the labels which have an ISRS greater than the pre-defined threshold. The image analysis module 201 provides (407) the label(s) and the corresponding ISRS to the sticker determination unit 202.

On receiving the assigned label(s) and the corresponding ISRS, the sticker determination unit 202 searches (408) for at least one sticker in the memory 203 that best matches the set of provided label(s), using a match with the combined score. The sticker determination unit 202 checks if at least one assigned label matches a keyword or a portion of a keyword associated with a sticker present in the memory 203. The sticker determination unit 202 determines a degree of overlap between the label and the keyword for a sticker. Based on the degree of overlap, the sticker determination unit 202 extracts (409) a set of stickers, which have at least one or more keywords which matches with the labels. The number of extracted stickers can be dependent on the number (diversity) of possible matching keywords. The at least one or more matches with the labels may vary as a function of the average number of keywords associated with the library of stickers. In an example herein, the sticker determination unit 202 can extract a set of ten keywords, which have two matches with the labels. The sticker determination unit 202 computes (410) the Image Set Score (ISS) for each extracted sticker by computing the sum product of the probability of each keyword of the sticker by the corresponding label ISRS. The sticker determination unit 202 sorts (411) the matching sticker(s) in descending order, based on the ISS. The sticker determination unit 202 provides (412) the sorted list of matching sticker(s) to the embellishment engine 205 which uses at least one aesthetic criteria in combination with the ISS to determine which sticker should be used. The embellishment engine 205 places (413) the sticker(s) on the layout in a suitable manner (as depicted in the example in FIG. 6C). The various actions in method 400 may be performed in the order presented, in a different order or simultaneously. Further, in some embodiments, some actions listed in FIG. 4 may be omitted.

Figure 5A:
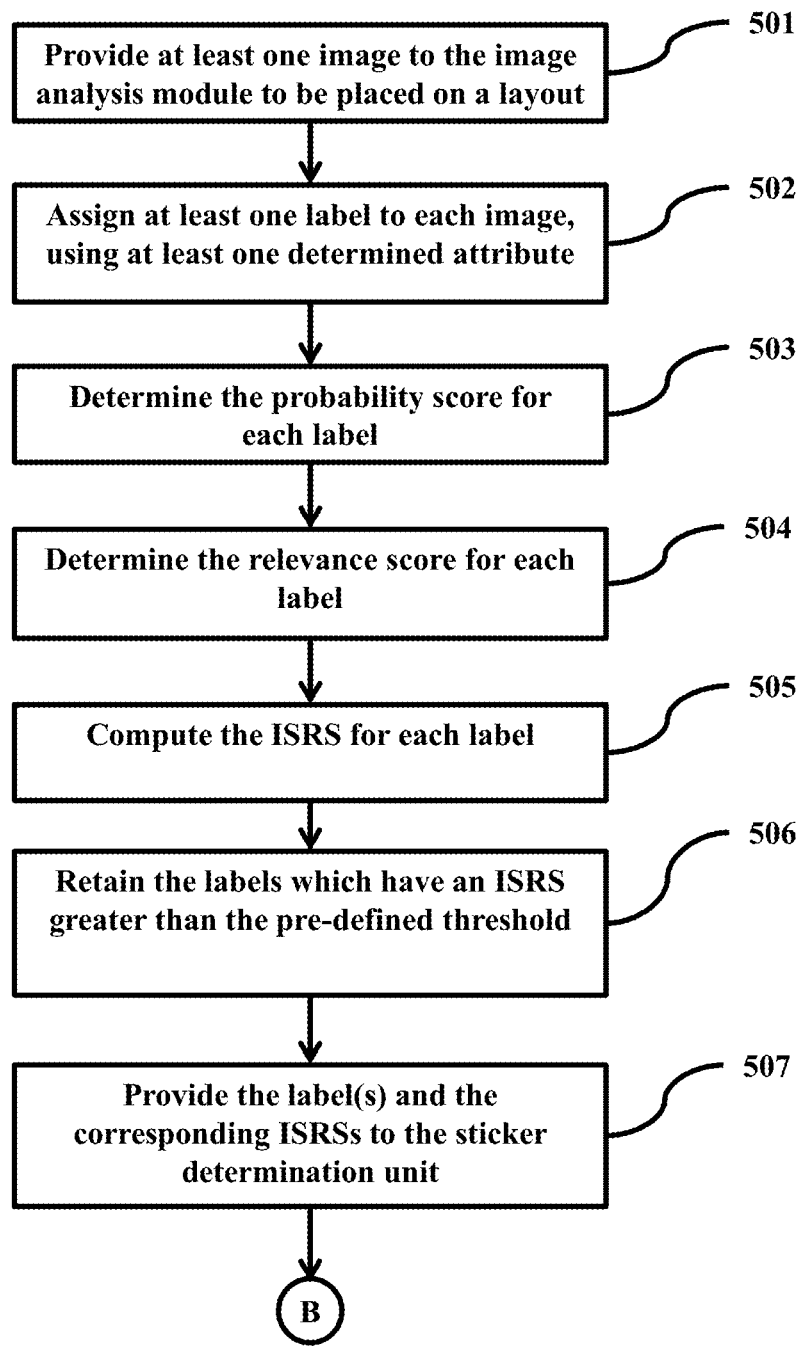
FIGS. 5A and 5B are flowcharts depicting the process of determining content aware stickers that can be applied onto a layout, wherein label(s) for an image present in the layout are determined automatically, according to embodiments as disclosed herein.
Figure 5B:
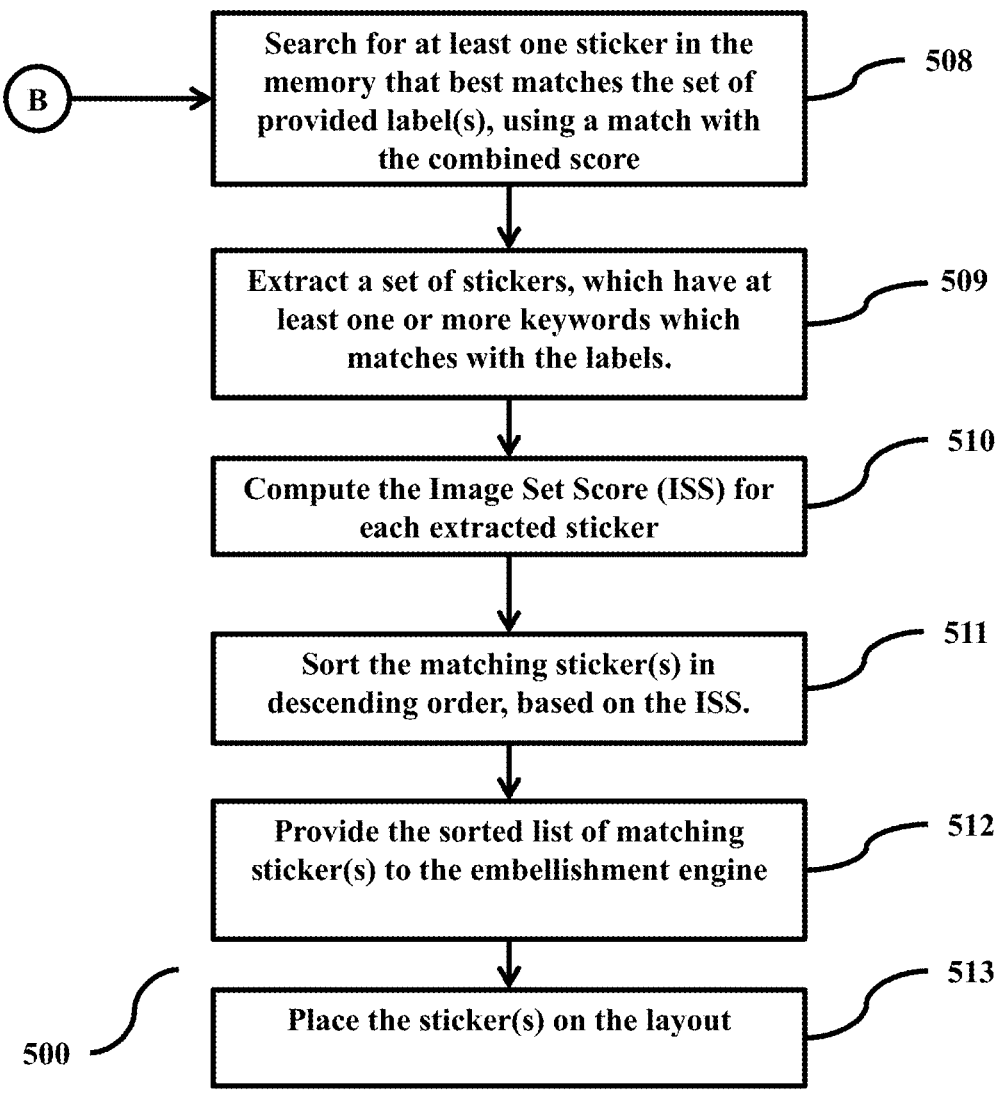

FIG. 5 is a flowchart depicting the process of determining content aware stickers that can be applied onto a layout, wherein label(s) for an image present in the layout are determined automatically. The user and/or an authorized user (such as an administrator) provides (501) at least one image to the image analysis module 201 to be placed on a layout (wherein the image can be placed in the layout (not shown)). The image analysis module 201 assigns (502) at least one label to each image, using at least one determined attribute. The image analysis module 201 can use computer vision to detect at least one attribute related to an image present in the layout. The image analysis module 201 determines (503) the presence probability for each of the labels, which represents the likelihood of the accuracy of the label prediction. The image analysis module 201 determines (504) the relevance score for each label, wherein the relevance score can depend on the prominence of the attribute associated with that label in that image. The relevance score can be a ratio/percentage that determines the importance of the label to the overall image. The image analysis module 201 computes (505) the Image Set Relevancy Score (ISRS) for all the labels in an image set. In an embodiment herein, the image analysis module 201 can compute the ISRS for each label by multiplying the probability score, and the relevance score of each label. In an embodiment herein, the image analysis module 201 can include the importance of the image to the overall layout, while determining the ISRS, wherein the image analysis module 201 can compute the ISRS for each label by multiplying the probability score, the relevance score of each label, and the importance of the image to the overall layout. The image analysis module 201 retains (506) the labels which have an ISRS greater than the pre-defined threshold. The image analysis module 201 provides (507) the label(s) and the corresponding ISRS to the sticker determination unit 202.

On receiving the assigned label(s) and the corresponding combined scores, the sticker determination unit 202 searches (508) for at least one sticker in the memory 203 that best matches the set of provided label(s), using a match with the combined score. The sticker determination unit 202 checks if at least one assigned label matches a keyword or a portion of a keyword associated with a sticker present in the memory 203. The sticker determination unit 202 determines a degree of overlap between the label and the keyword for a sticker. Based on the degree of overlap, the sticker determination unit 202 extracts (509) a set of keywords, which have at least one or more matches with the labels. The number of extracted stickers can be dependent on the number (diversity) of possible matching keywords. The at least one or more matches with the labels may vary as a function of the average number of keywords associated the library of stickers. In an example herein, the sticker determination unit 202 can extract a set of ten keywords, which have two matches with the labels. The sticker determination unit 202 computes (510) the Image Set Score (ISS) for each sticker by computing the sum product of the presence probability of each keyword associated with the sticker by the corresponding label ISRS. The sticker determination unit 202 sorts (511) the matching sticker(s) in descending order, based on the ISS. The sticker determination unit 202 provides (512) the sorted list of matching sticker(s) to the embellishment engine 205 which uses at least one aesthetic criteria in combination with the ISS to determine which sticker should be used. The embellishment engine 205 places (513) the sticker(s) on the layout in a suitable manner (as depicted in the example in FIG. 6C). The various actions in method 500 may be performed in the order presented, in a different order or simultaneously. Further, in some embodiments, some actions listed in FIG. 5 may be omitted.

Embodiments herein can be used in the creation of a coffee table photo book, digital photo narrative with photo layouts, a calendar, a collage, a power point presentation, a poster, a greeting card, and so on.

The embodiments disclosed herein can be implemented through at least one software program running on at least one hardware device and performing network management functions to control the network elements. The network elements shown in FIGS. 2A, 2B, 2C, and 3 include blocks, which can be at least one of a hardware device, or a combination of hardware device and software module.

The embodiment disclosed herein specifies methods and systems for determining at least one content aware sticker that can be applied onto a layout (wherein the layout can be a digital layout or a physical layout) and the stickers can add a decorative or narrative element about the images and/or the layout. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A method for determining at least one content aware sticker that can be applied onto a layout, the method comprising:
   determining, by an image analysis module, a presence probability for all labels assigned to at least one image present in the layout;
   determining, by the image analysis module, a relevance score for all labels assigned to at least one image present in the layout;
   determining, by the image analysis module, an Image Set Relevancy Score (ISRS) for all labels assigned to at least one image present in the layout;
   retaining, by the image analysis module, at least one label, which has an ISRS greater than the pre-defined threshold;
   searching, by a sticker determination unit, for at least one sticker that best matches the set of provided label(s), using a match with the ISRS;
   checking, by a sticker determination unit, for at least one sticker matching with at least one label received from the image analysis module, wherein the match is based on a match with the relevance score;
   extracting, by the sticker determination unit, a set of stickers, which have at least one or more keywords which matches with the at least one label;
   computing, by the sticker determination unit, an Image Set Score (ISS) for each extracted sticker as a sum product of probability of each keyword of the sticker with the ISRS of the corresponding label; and sorting, by the sticker determination unit, the sticker(s) in descending order based on their ISS.

2. The method, as claimed in claim 1, wherein the method further comprises assigning at least one label to each image, using at least one determined attribute.

3. The method, as claimed in claim 2, wherein the method comprises using computer vision to detect the at least one attribute.

4. The method, as claimed in claim 1, wherein the relevance score of each label present in at least one image depends on prominence of an attribute associated with that label in that image.

5. The method, as claimed in claim 1, wherein the ISRS is computed for each label by multiplying the probability score, and the relevance score of each label.

6. The method, as claimed in claim 1, wherein the ISRS is computed for each label by multiplying the probability score, the relevance score of each label, and the importance of the image to the overall layout.

7. The method, as claimed in claim 1, wherein the method further comprises using available white space to sort the stickers.

8. The method, as claimed in claim 1, wherein the method further comprises assigning at least one keyword to each sticker automatically using at least one of computer vision techniques, Optical Character Recognition (OCR), and image/schematic analysis.

9. The method, as claimed in claim 1, wherein the keyword and the label belong to the same lexicon.

10. The method, as claimed in claim 1, wherein the method further comprises providing, by the sticker determination unit, the sorted sticker(s) to an embellishment engine.

11. A system for determining at least one content aware sticker that can be applied onto a layout, the system comprising:
   an image analysis module configured for:
      determining a presence probability for all labels assigned to at least one image present in the layout;
      determining a relevance score for all labels assigned to at least one image present in the layout;
      determining an Image Set Relevancy Score (ISRS) for all labels assigned to at least one image present in the layout; and
      retaining at least one label, which has an ISRS greater than the pre-defined threshold; and
   a sticker determination unit configured for:
      searching for at least one sticker that best matches the set of provided label(s), using a match with the ISRS;
      checking for at least one sticker matching with at least one label received from the image analysis module, wherein the match is based on a match with the relevance score;
      extracting a set of stickers, which have at least one or more keywords which matches with the at least one label;
      computing an Image Set Score (ISS) for each extracted sticker as a sum product of probability of each keyword of the sticker with the ISRS of the corresponding label; and
      sorting the sticker(s) in descending order based on their ISS.

12. The system, as claimed in claim 11, wherein the image analysis module is further configured for assigning at least one label to each image, using at least one determined attribute.

13. The system, as claimed in claim 12, wherein the image analysis module is further configured for using computer vision to detect the at least one attribute.

14. The system, as claimed in claim 11, wherein the relevance score of each label present in at least one image depends on prominence of an attribute associated with that label in that image.

15. The system, as claimed in claim 11, wherein the image analysis module is configured for computing the ISRS for each label by multiplying the probability score, and the relevance score of each label.

16. The system, as claimed in claim 11, wherein the image analysis module is configured for computing the ISRS for each label by multiplying the probability score, the relevance score of each label, and the importance of the image to the overall layout.

17. The system, as claimed in claim 11, wherein the sticker determination unit is further configured for using available white space to sort the stickers.

18. The system, as claimed in claim 11, wherein at least one keyword is assigned to each sticker automatically using at least one of computer vision techniques, Optical Character Recognition (OCR), and image/schematic analysis.

19. The system, as claimed in claim 11, wherein the keyword and the label belong to the same lexicon.

20. The system, as claimed in claim 11, wherein the sticker determination unit is further configured for providing the sorted sticker(s) to an embellishment engine.

* * * * *